(12) United States Patent
Wei

(10) Patent No.: US 10,005,559 B2
(45) Date of Patent: Jun. 26, 2018

(54) CRASH-RESISTANT AIRCRAFT AND CRASH-RESISTANT CONTROL METHOD

(71) Applicant: Guoxin Wei, Fuzhou (CN)

(72) Inventor: Guoxin Wei, Fuzhou (CN)

( * ) Notice: Subject to any disclaimer, the term of this patent is extended or adjusted under 35 U.S.C. 154(b) by 0 days. days.

(21) Appl. No.: 15/516,035

(22) PCT Filed: Sep. 9, 2015

(86) PCT No.: PCT/CN2015/089227
§ 371 (c)(1),
(2) Date: Mar. 31, 2017

(87) PCT Pub. No.: WO2017/035852
PCT Pub. Date: Mar. 9, 2017

(65) Prior Publication Data
US 2017/0305563 A1    Oct. 26, 2017

(30) Foreign Application Priority Data

Sep. 1, 2015   (CN) .......................... 2015 1 0549665

(51) Int. Cl.
*B64C 39/00* (2006.01)
*B64D 25/00* (2006.01)
(Continued)

(52) U.S. Cl.
CPC .............. *B64D 25/00* (2013.01); *B64C 1/062* (2013.01); *B64C 1/16* (2013.01); *B64C 11/46* (2013.01); *B64D 31/06* (2013.01); *G05D 1/042* (2013.01)

(58) Field of Classification Search
CPC ........ B64D 17/80; B64D 25/12; B64D 25/08; B64D 31/06; B64D 9/00; B64D 19/02;
(Continued)

(56) References Cited

U.S. PATENT DOCUMENTS 1,812,451 A    6/1931   Schapel
2,388,380 A *  11/1945  Bathurst .................. B64C 1/22
                                                     220/1.5
(Continued)

FOREIGN PATENT DOCUMENTS

CN    1270124 A    10/2000
CN    1456478 A    11/2003
(Continued)

*Primary Examiner* — Medhat Badawi
(74) *Attorney, Agent, or Firm* — Luoh J. Wu; Continent Patent Office LLP

(57) ABSTRACT

A novel crash-resistant aircraft includes a fuselage and an aircraft base connected together via a movable fastener, and said fuselage comprises a cockpit, a cabin and an empennage. The aircraft base comprises a bellyhold cargo bay, a fuel tank, an undercarriage, a power unit and wings. The empennage is also connected to the tail end of said fuselage via a movable fastener. A crash-resistant propeller system capable of bringing said fuselage upward is set up at the top of said cabin, a crash-resistant recoil devices set up beneath said cabin. The crash-resistant aircraft also comprises a control system disposed in said cockpit, and when said aircraft is in an accident in midair, said control system releases said movable fastener to abandon said aircraft base and said empennage. Also disclosed is a crash-resistant operation method of the crash-resistant aircraft.

5 Claims, 5 Drawing Sheets

(51) Int. Cl.
*B64C 1/06* (2006.01)
*B64C 1/16* (2006.01)
*B64C 11/46* (2006.01)
*B64D 31/06* (2006.01)
*G05D 1/04* (2006.01)

(58) Field of Classification Search
CPC ........ B64D 19/00; B64D 25/00; B64D 17/72;
B64D 1/08; B64D 5/00; B64C 2201/18;
B64C 2201/187; B64C 2201/201; B64C
39/028; B64C 19/00; B64C 1/062; B64C
1/16; B64C 11/46; B64C 1/30; B64C
2201/104; B64C 2201/165; B64C 13/04;
B64C 13/18; B64C 29/0033; B64C
29/0075; B64C 3/54; B64C 29/0025;
B64C 23/005; B64C 2700/6291; B64C
27/26; A63H 27/001; A63H 27/02; B60R
2021/0016; B60R 2021/0093; Y02T
50/145; Y10S 70/06; Y10T 70/7051;
G05D 1/042; B64F 1/10
See application file for complete search history.

(56) References Cited

U.S. PATENT DOCUMENTS

| | | | | |
|---|---|---|---|---|
| 2,497,590 A * | 2/1950 | Drill | ............ | B64D 25/00 244/139 |
| 3,227,399 A * | 1/1966 | Dastoli | ............ | B64C 1/062 244/140 |
| 3,401,906 A * | 9/1968 | Girard | ............ | B64D 19/02 244/138 A |
| 3,508,727 A * | 4/1970 | Willems | ............ | B64D 17/00 244/140 |
| 4,143,841 A * | 3/1979 | Roeder | ............ | B64D 25/12 244/140 |
| 4,306,693 A * | 12/1981 | Cooper | ............ | B64D 37/12 137/572 |
| 4,691,878 A * | 9/1987 | Vaughan | ............ | B64C 3/56 244/49 |
| 4,699,336 A * | 10/1987 | Diamond | ............ | B64C 1/32 244/140 |
| 5,356,097 A * | 10/1994 | Chalupa | ............ | B64D 25/12 244/100 A |
| 5,568,903 A * | 10/1996 | Pena | ............ | B64C 1/32 244/139 |
| 5,921,504 A * | 7/1999 | Elizondo | ............ | B64D 25/12 244/120 |
| 6,382,563 B1 * | 5/2002 | Chiu | ............ | B64D 25/12 244/120 |
| 6,464,170 B2 * | 10/2002 | Carpenter | ............ | B64C 39/10 244/118.2 |
| 6,471,158 B1 * | 10/2002 | Davis | ............ | B64C 27/02 244/8 |
| 6,494,404 B1 * | 12/2002 | Meyer | ............ | B64C 39/02 244/118.1 |
| 6,554,227 B2 * | 4/2003 | Wolter | ............ | B64D 25/12 244/140 |
| 6,682,017 B1 | 1/2004 | Giannakopoulos | | |
| 6,761,334 B1 * | 7/2004 | Nutu | ............ | B64D 25/12 244/120 |
| 6,776,373 B1 * | 8/2004 | Talmage, Jr. | ............ | B64D 25/12 244/140 |
| 6,948,682 B1 * | 9/2005 | Stephenson | ............ | B64G 1/14 244/36 |
| 7,234,667 B1 * | 6/2007 | Talmage, Jr. | ............ | B64C 1/00 244/120 |
| 7,490,792 B1 * | 2/2009 | Carter, Jr. | ............ | B64C 27/001 244/17.27 |
| 8,376,264 B1 * | 2/2013 | Hong | ............ | B64C 27/26 244/17.23 |
| 9,010,678 B1 * | 4/2015 | Hiller | ............ | B60F 5/02 244/2 |
| 9,193,460 B2 * | 11/2015 | Laudrain | ............ | B64C 39/02 |
| 2003/0080250 A1 * | 5/2003 | Velden | ............ | B64C 37/02 244/118.5 |
| 2005/0242240 A1 * | 11/2005 | Giannakopoulos | ...... | B64C 13/04 244/140 |
| 2009/0014587 A1 * | 1/2009 | Bertani | ............ | B64C 3/10 244/120 |
| 2011/0226174 A1 * | 9/2011 | Parks | ............ | B60F 5/02 114/313 |
| 2011/0233341 A1 * | 9/2011 | Monteforte | ............ | B64D 25/12 244/140 |
| 2011/0315806 A1 | 12/2011 | Piasecki et al. | | |
| 2012/0261523 A1 * | 10/2012 | Shaw | ............ | B64C 29/0033 244/7 R |
| 2014/0299708 A1 * | 10/2014 | Green | ............ | B64C 27/32 244/17.23 |
| 2015/0203201 A1 * | 7/2015 | Tao | ............ | B64C 3/44 244/90 R |
| 2016/0304194 A1 * | 10/2016 | Bevirt | ............ | B64C 29/0033 |

FOREIGN PATENT DOCUMENTS

| | | |
|---|---|---|
| CN | 1666926 A | 9/2005 |
| CN | 102107735 A | 6/2011 |
| CN | 205010497 U | 2/2016 |
| RU | 2375250 C1 | 12/2009 |

\* cited by examiner

CRASH-RESISTANT AIRCRAFT AND CRASH-RESISTANT CONTROL METHOD

CROSS REFERENCE TO RELATED APPLICATIONS

This application is the national phase entry of International Application No. PCT/CN2015/089227, filed on Sep. 9, 2015, which is, based upon and claims priority to Chinese Patent Application No. 201510549665.2 filed on Sep. 1, 2015, the entire contents of which are incorporated herein by reference.

TECHNICAL FIELD

The present invention relates to a novel crash-resistant aircraft and crash-resistant control method.

BACKGROUND OF THE INVENTION

As one of the greatest inventions in the 20$^{th}$ century, the invention of the aircraft has realized people's dream of flying for thousands of years. While the aircraft is a double-edged sword for human beings, the catastrophe happens sometimes because of the aviation accident. For example, Air France Flight 447 with the complete fuselage crashed into the Atlantic Ocean at high speed, killing all 288 passenger, in June 2009; the TU-154 special plane of the President of Poland Kaczynski crashed during landing near the Smolensk North Airport—a former military airbase on the way from Warsaw to Smolensk, Russia, killing all 96 people on board, on 10 Apr. 2010; Malaysia Airlines Flight 370 disappeared on 8 Mar. 2014 while flying from Kuala Lumpur to Beijing, causing more than 200 passengers missing. Whatever led to such a tragic aviation accident made people feel very shock and fear. According to the relevant information, about 1000 people died from aviation accident every year in the whole world and four civil aviation accidents happened causing more than 700 people dead or missing only in the first half of 2014.

When every major aviation accident occurred, people questioned why a passenger aircraft wasn't equipped with a parachute.

Finally, this idea is impossible and impractical to be denied because of high altitude environment and skill needed by parachuting.

While mankind have taken various of explorations how to avoid the aviation accident and how to keep people's lives safe during crash.

One of the explorations is that an entire civil aviation airliner is equipped with a large parachute and the practice applied for aviette has achieved success, however, the practice applied for airliner hasn't implemented and one of important reasons is that an airliner is too large and heavy. To make a large airliner, for example, Boeing 747 carrying about 500 passengers, land safely, twenty-one parachutes are needed and the size of each parachute amounts to a football field, therefore, the practice isn't obviously feasible. To reduce the number of parachute canopies, one way is to abandon all heavy components of the aircraft such as wings and engines in the event of an emergency and the parachute is only responsible for saving the cabin to reduce the weight that the parachute need to bear. While the system is very complicated and clumsy and multiple safety devices are adopted to prevent the failure of the parachute's spread. However, in case of emergency on the airliner, the situation can't be riled out that the parachute can't spread successfully.

In addition, the spread of the parachute needs a certain amount of time at a certain spatial height but the plane crash mostly occurs during taking off and landing at this time the height of aircraft is very low so that once the accident happens, before the parachutes have spread, the aircraft has dropped to the ground. Consequently, the adopt of parachute is theoretically feasible, but impractical.

SUMMARY OF THE INVENTION

The present invention has been made in view of the above-mentioned problems of the prior art, that is, the technical problem to be solved by the present invention is to provide a novel crash-resistant aircraft and crash-resistant control method which can ensure that the aircraft lands safely in the event of a serious accident and has wide application prospects.

To solve the said problem, the technical solution of the present invention is: a novel crash-resistant aircraft comprises a fuselage and an aircraft base connected together via a movable fastener, said fuselage comprises a cockpit, a cabin and an empennage, said aircraft base comprises a bellyhold cargo bay, a fuel tank, a undercarriage, a power unit and wings, wherein said empennage is also connected to the tail end of said fuselage via a movable fastener, a crash-resistant propeller system capable of bringing said fuselage upward is set up at the top of said cabin, a crash-resistant recoil device is set up beneath said cabin and the crash-resistant aircraft also comprises a control system disposed in said cockpit. When the aircraft is in an accident in midair, the control system releases the movable fastener to abandon the aircraft base and the empennage and controls the crash-resistant propeller system and the crash-resistant recoil device to operate, such that the fuselage can land safely.

Preferably, said top of the cabin is provided with a top cover capable of springing open automatically and covering said crash-resistant propeller system.

Preferably, said crash-resistant propeller system comprises rectangle base whose two ends are provided with a first propeller and a second propeller respectively, and said first propeller and said second propeller are respectively located on two sides of the median of said rectangle base, then the center of said rectangle base is provided with a rotating shaft driven by hydraumatic, and said rotating shaft is provided with a Z-shaped supporting rod whose two ends are telescopic rods and are provided with a third propeller and a forth propeller respectively, and before said supporting rod is actuated, said supporting rod is parallel to the median of said rectangle base to make said first propeller and said third propeller arranged side by side and make said second propeller and said forth propeller arranged side by side; said four propellers all comprise a lifting hydraulic cylinder, a coaxial motor above said cylinder and a transmission shaft actuated by motor, and the upper part of the side wall of said transmission shaft is provided with a fixed propeller blade and hinged with at least one movable propeller blade, and before said transmission shafts are actuated, four fixed propeller blades are arranged parallel to each other and toward the center of said rectangle base and said fixed propeller blade and said movable propeller blade on one transmission shaft overlap, said side wall of said transmission shaft is provided with slots whose number is equal to the number of said movable propeller blades, then the terminus of said slot is provided with a spring cotter and said movable propeller blade is provided with a fixing hole into which said spring cotter is plugged to fix said movable propeller blade when said movable propeller blade driven by said transmission shaft rotates along said slot to said terminus of said slot.

Preferably, said recoil device comprises a hydraulic system and an independent propeller.

Preferably, said aircraft comprises a hydraulic system and an independent battery in said fuselage and said tail end of said fuselage is provided with a water propeller.

Preferably, said movable fastener comprises a pull rod connected to said hydraulic system, several hooks hinged on the inner side wall of the bottom of said fuselage and several hanging rods on the inside of the top of said aircraft base, said hooks' number is equal to the number of said hanging rods and said hanging rod hangs on said hook provided with a push rod, and said pull rod is provided with shrink-rings at a certain interval whose number is equal to the number of said hooks, and one end of said push rod passes through said corresponding shrink-ring, furthermore, said hanging rod comprises a convex shaft fastened on said aircraft base and a rotating drum sheathed on said convex shaft, therefore, when said hydraulic system drives said pull rod to move laterally, said pull rod drives said hook to rotate around the axis of said articulated shaft so that said hanging rod is disengaged from said hook.

Preferably, said movable fastener comprises a strap, a explosive bolt and a pollution-free detonating cord and the movable fastener is another disengagement way of the fuselage from the aircraft base, the empennage and the crash-resistant base.

Preferably, said rectangle base is also fixed on the top of said fuselage via a movable fastener.

To solve the above-mentioned problem, how to achieve the object is as follows: the crash-resistant control method of the novel crash-resistant aircraft adopting the above-mentioned crash-resistant aircraft follows the below steps: when said aircraft is in serious trouble, a pilot actuates said control system to release said movable fastener, spring open said top cover and meanwhile abandon said aircraft base and said empennage; said first propeller and said second propeller are risen up and their propeller blades rotate, quickly; said supporting rod rotates 90°, then it is perpendicular to said rectangle base and said two ends of said supporting rod respectively stretch outward to a preset length, then said third propeller and said forth propeller are risen up and their propeller blades rotate quickly; the lift force produced with four propellers' rotation simultaneously make said fuselage descend slowly and steadily; when said fuselage is about to land, said crash-resistant recoil device beneath said fuselage start to work to further decrease the descent speed of said fuselage to make said fuselage land safely.

Preferably, the balance of said fuselage during descent is ensured by controlling the rotational speed of said four propellers.

Compared to the prior art, the advantageous effects of the present invention are as follows:

1. The structure is simple, easy to operate and is not so complicated and clumsy as the structure of the parachutes provided for the entire airliner;
2. The novel crash-resistant aircraft occupies small space, is easy to place and doesn't occupy so large space as the entire airliner provided with parachutes;
3. Meeting an emergency is fast which takes no more than 5-15 s at most while it takes more time to open the parachutes provided for the entire airliner;
4. The novel crash-resistant aircraft is reliable during using and it'll work once it's started, however, whether the parachutes provided for the entire airliner can be spread successfully at a critical moment or not is still unknown because of the complicated structure;
5. The novel crash-resistant aircraft can meet an emergency to be started quickly at low height, while the parachutes provided for the entire airliner are useless at low height because the plane has already dropped to the ground before the parachutes have spread.

Then the invention will be described in further detail with reference to the accompanying drawings and a specific embodiment.

Signs herein: 1—fuselage, 10—top cover, 11—empennage, 12—rectangle base, 13—pull rod, 14—hook, 15—convex shaft, 16—rotating drum, 17—push rod, 18—shrink-ring, 19—axis of articulated shaft, 2—aircraft base, 3—first propeller, 31—transmission, 32—fixed propeller blade, 33—movable propeller blade, 34—slot, 35—fixing hole, 4—second propeller, 5—third propeller, 6—forth propeller, 7—rotating shaft, 8—supporting rod, 81—telescopic rod, 9—crash-resistant recoil device.

DETAILED DESCRIPTION OF THE INVENTION

Figure 1:
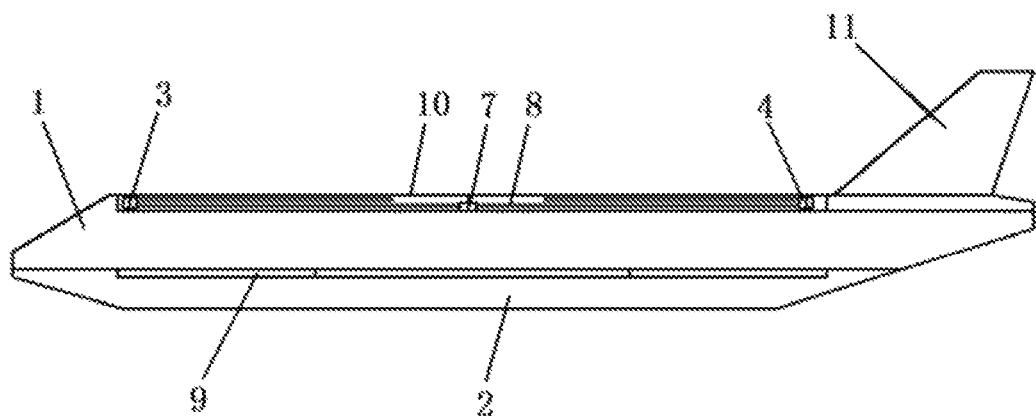
FIG. 1 is an elevation of a novel crash-resistant aircraft in a normal condition in the preferred embodiment of the present invention.
Figure 2:
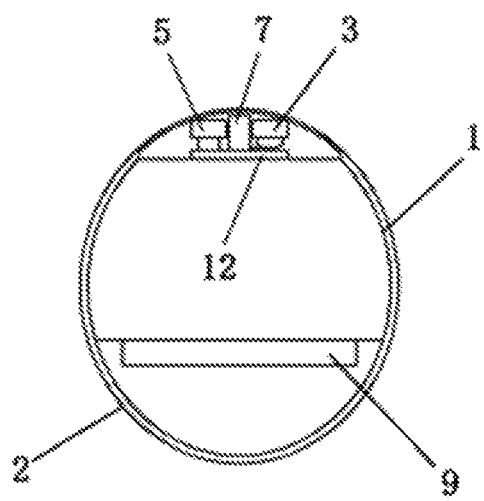
FIG. 2 is a side view of a novel crash-resistant aircraft in a normal condition in the preferred embodiment of the present invention.
Figure 3:
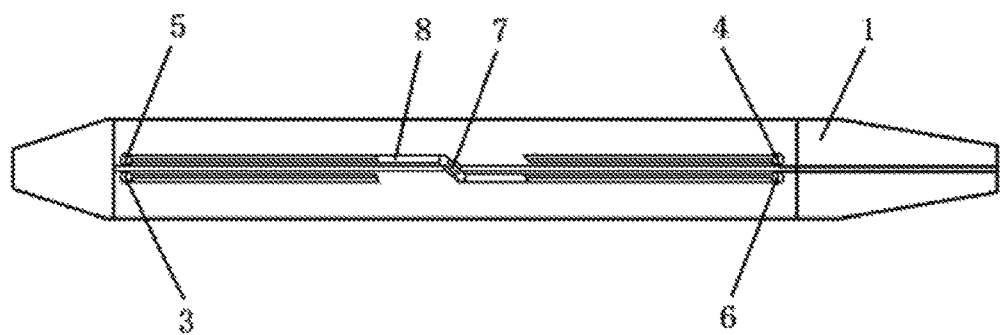
FIG. 3 is a top view of a novel crash-resistant aircraft abandoning the aircraft base and the empennage in the preferred embodiment of the present invention.
Figure 4:
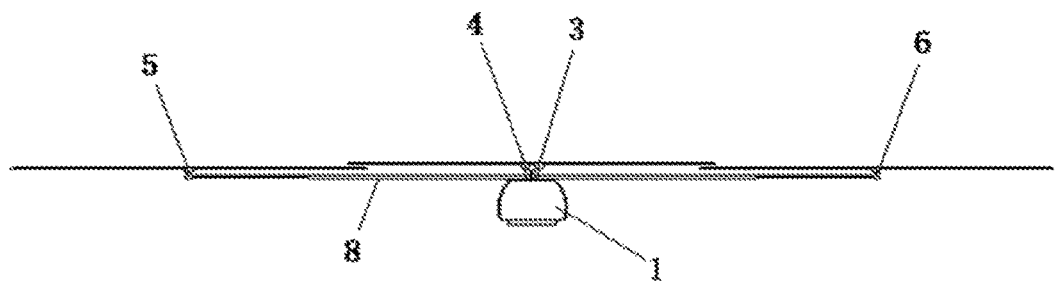
FIG. 4 is a side view of a novel crash-resistant aircraft with the stretched propeller in the preferred embodiment of the present invention.
Figure 5:
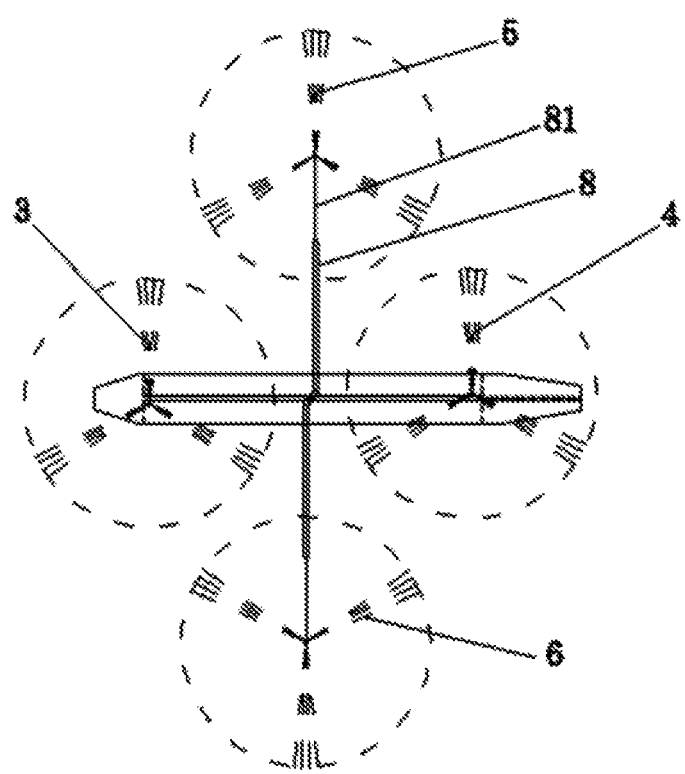
FIG. 5 is a top view of a novel crash-resistant aircraft with the stretched propeller in the preferred embodiment of the present invention.
Figure 6:
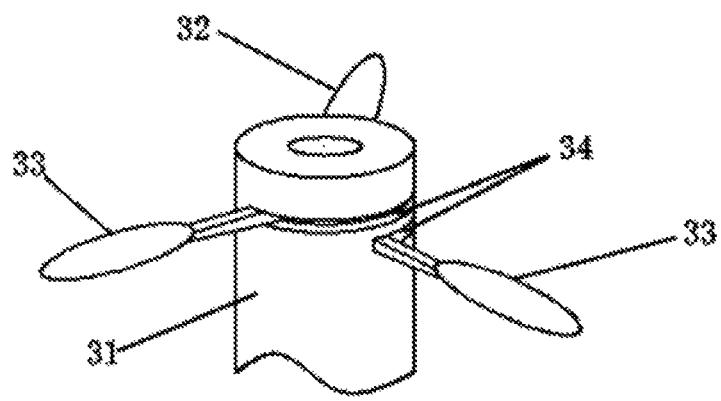
FIG. 6 is a structural view of a propeller in the preferred embodiment of the present invention.
Figure 7:
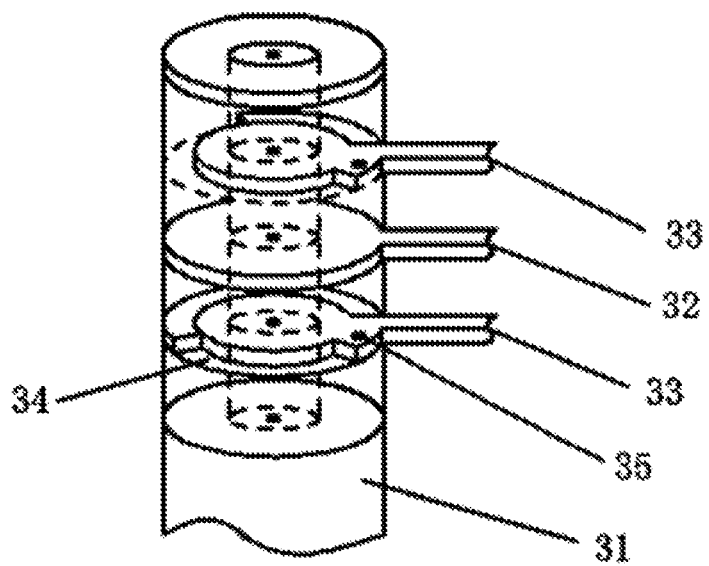
FIG. 7 is a exploded stereo gram of a propeller in the preferred embodiment of the present invention.
Figure 8:
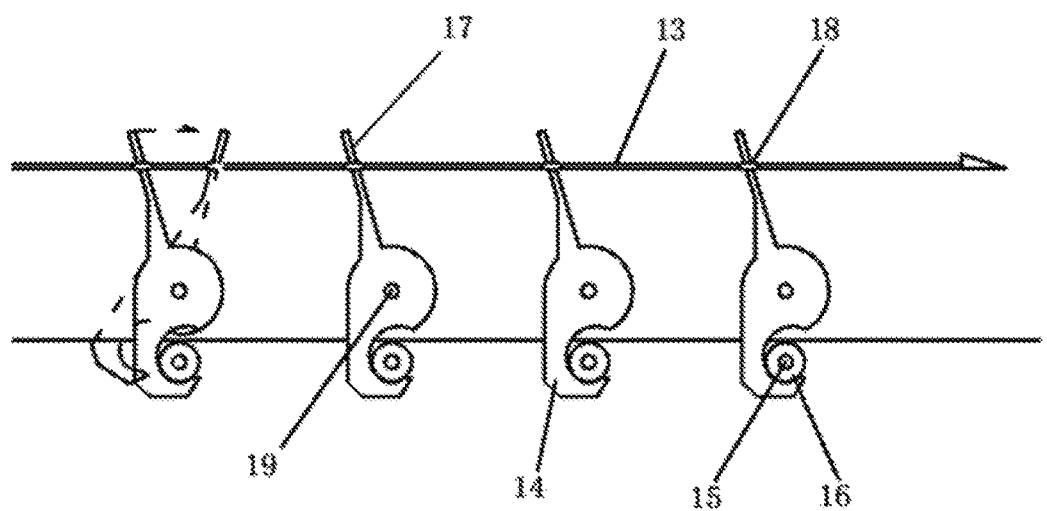
FIG. 8 is a structural view of one movable fastener in the preferred embodiment of the present invention.

As shown in FIG. 1-8, a novel crash-resistant aircraft comprises a fuselage 1 and a aircraft base 2 connected together via a movable fastener, wherein said fuselage 1 comprises a cockpit, a cabin and an empennage 11, said aircraft base 2 comprises a bellyhold cargo bay, a fuel tank, a undercarriage, a power unit and wings, said empennage 11 is also connected to the tail end of said fuselage via a movable fastener, a crash-resistant propeller system capable of bringing said fuselage upward is set up at the top of said cabin, a crash-resistant recoil device 9 is set up beneath said cabin, said crash-resistant aircraft, also comprises a control system disposed in said cockpit, and when said aircraft is in an accident in midair, said control system releases said movable fastener to abandon said aircraft base 2 and said empennage 11 and controls said crash-resistant propeller system and said crash-resistant recoil device 9 to operate, such that said fuselage 1 can land safely.

In the preferred embodiment, said top of the cabin is provided with a top cover capable of springing open automatically and covering said crash-resistant propeller system.

In the preferred embodiment, said crash-resistant propeller system comprises rectangle base 12 whose two ends are provided with a first propeller 3 and a second propeller 4 respectively, and said first propeller 3 and said second propeller 4 are respectively located on two sides of the median of said rectangle base 12, then the center of said rectangle base 12 is provided with a rotating shaft 7 driven by hydraumatic, and said rotating shaft 7 is provided with a Z-shaped supporting rod 8 whose two ends are telescopic rods 81 and are provided with a third propeller 5 and a forth propeller 6 respectively, and before said supporting rod 8 is actuated, said supporting rod is parallel to the median of said rectangle base 12 to make said first propeller and said third propeller arranged side by side and make said second propeller and said forth propeller arranged side by side; said four propellers all comprise a lifting hydraulic cylinder, a coaxial motor above said cylinder and a transmission shaft 31 actuated by motor, and the upper part of the side wall of said transmission shaft 31 is provided with a fixed propeller blade 32 and hinged with at least one movable propeller blade 33, and before said transmission shafts are actuated, four fixed propeller blades 32 are arranged parallel to each other and toward the center of said rectangle base and said fixed propeller blade 32 and said movable propeller blade 33 on one transmission shaft overlap, said side wall of said transmission shaft 31 is provided with slots 34 whose number is equal to the number of said movable propeller blades, then the terminus of said slot is provided with a spring cotter and said movable propeller blade is, provided with a fixing hose 35 into which said spring cotter is plugged to fix said movable propeller blade when said movable propeller blade 33 driven by said transmission shaft 31 rotates along said slot to said terminus of said slot 34.

In the preferred embodiment, said recoil device comprises several thrust-reversal rockets.

In the preferred embodiment, the aircraft comprises a hydraulic system and an independent battery in the fuselage; the hydraulic system provides power for the rotation, rise and fall of the propellers, and controls the release of the movable fastener; the independent battery independently provides power for the rotation of the propellers and the running of the hydraulic system, moreover, the tail end of the fuselage is provided with a water propeller. When the aircraft descend on the water and the crash-resistant system of the propellers is bounced automatically, the water propeller pushes the fuselage to move forward automatically to avoid crushing the fuselage because of the drop of the crash-resistant system again, and make the fuselage move forward on the water. Definitely, said fuselage has a waterproof function.

In the preferred embodiment, said movable fastener comprises a pull rod 13 connected to the hydraulic system, several hooks 14 hinged on the inner side wall of the bottom of the fuselage and several hanging rods on the inside of the top of the aircraft base, wherein said the number of hooks 14 is equal to the number of the hanging rods and the hanging rod hangs on the hook 14 provided with a push rod, the hook 14 is provided with push rod 17, then the pull rod is provided with shrink-rings 18 at a certain interval whose number is equal to the number of the hooks, and one end of the push rod passes through the corresponding shrink-ring, furthermore, said hanging rod comprises a convex shaft 15 fastened on the aircraft base and a rotating drum 16 sheathed on the convex shaft, therefore, when the hydraulic system drives the pull rod to move laterally, the pull rod drives the hook to rotate around the axis of the articulated shaft 19 so that the hanging rod is disengaged from the hook.

In the preferred embodiment, said rectangle base 12 is also fixed on the top of the fuselage via a movable fastener.

The abreast arrangement of the propellers and the overlapped design of the propeller blades both can save space greatly, the hydraulic system, and the independent battery in the fuselage make sure that the actuator and the energy aren't affected by the damaged parts of the aircraft and the fuselage can run independently.

The crash-resistant control method of the novel crash-resistant aircraft adopting the above-mentioned crash-resistant aircraft follows the below steps: when said aircraft is in serious trouble, a pilot actuates said control system to release said movable fastener, spring open said top cover and meanwhile abandon said aircraft base and said empennage; said first propeller and said second propeller are risen up and their propeller blades rotate quickly; said supporting rod rotates 90°, then it is perpendicular to said rectangle base and said two ends of said supporting rod respectively stretch outward to a preset length, then said third propeller and said forth propeller are risen up and their propeller blades rotate quickly; the lift force produced with four propellers' rotation simultaneously make said fuselage descend slowly and steadily; when said fuselage is about to land, said crash-resistant recoil device beneath said fuselage start to work to further decrease the descent speed of said fuselage to make said fuselage land safely.

In the preferred embodiment, the balance of the fuselage during descent is ensured by controlling the rotational speed of four propellers.

It should be noted that the foregoing are preferred embodiments of the present invention. To those of ordinary skill, a number of changes and modifications according to the present invention shall also be considered as within the scope of the invention.

What is claimed is:

1. A crash-resistant aircraft comprising
   an aircraft base, comprising a bellyhold cargo bay and wings;
   a fuselage, connected with said aircraft base via a movable fastener, and comprising a cockpit, a cabin and an empennage, wherein said empennage is also connected to a tail end of said fuselage via said movable fastener;
   a crash-resistant propeller system, capable of bringing said fuselage upward, and set up at a top of said cabin;
   a crash-resistant recoil device, set up beneath said cabin;
   wherein when said aircraft is in an accident in midair, said movable fastener is released to abandon said aircraft base and said empennage, and said crash-resistant propeller system and said crash-resistant recoil device is driven to operate, such that said fuselage will be landed safely;
   wherein said top of said cabin is provided with a top cover covering said crash-resistant propeller system and capable of popping open;
   wherein said crash-resistant propeller system comprises
      a rectangle base;
      a first propeller and a second propeller, set on two ends of said rectangle base respectively, and located on two sides of a median of said rectangle base respectively;
      a rotating shaft, set on a center of said rectangle base, and driven by hydraumatic;
      a Z-shaped supporting rod, set on said rotating shaft and whose two ends are telescopic rods, wherein said Z-shaped supporting rod includes two parallel rods and a diagonal rod connecting two ends of said two parallel rods forming Z shape;

a third propeller and a forth propeller, set on said two ends of said Z-shaped supporting rod respectively, wherein before said Z-shaped supporting rod is actuated, said Z-shaped supporting rod is parallel to the median of said rectangle base to make said first propeller and said third propeller arranged side by side and make said second propeller and said forth propeller arranged side by side;

wherein each of the first, second, third and fourth propellers comprise
a lifting hydraulic cylinder,
a coaxial motor above said cylinder,
a transmission shaft, actuated by motor,
a fixed propeller blade, in an upper part of a side wall of said transmission shaft,
at least one movable propeller blade, hinged with said upper part, wherein before said transmission shaft is actuated, the fixed propeller blade is arranged parallelly toward one central line of said rectangle base, and said fixed propeller blade and said movable propeller blade overlap on one transmission shaft,
slots, in said side wall of said transmission shaft, and whose number is equal to the number of said movable propeller blade, wherein an end of said slot is provided with a spring cotter and said movable propeller blade is provided with a fixing hole into which said spring cotter is plugged to fix said movable propeller blade when said movable propeller blade driven by said transmission shaft rotates along said slot to said end of said slot.

2. The crash-resistant aircraft of claim 1, wherein said movable fastener comprises
a pull rod;
a plurality of hooks, hinged on an inner side wall of the bottom of said fuselage, wherein each hook is provided with a push rod;
a plurality of hanging rods, on an inside of the top of said aircraft base, wherein the number of said plurality of hooks is equal to the number of said plurality of hanging rods, and said plurality of hanging rods hang on said hooks;
a plurality of shrink-rings, on said pull rod at a certain interval and whose number is equal to the number of said plurality of hooks, wherein one end of said push rod passes through a corresponding shrink-ring;
wherein each hanging rod comprises
a convex shaft, fastened on said aircraft base,
a rotating drum, sheathed on said convex shaft,
wherein when said pull rod is driven to move laterally, said pull rod drives each hook to rotate around an axis of an articulated shaft so that said plurality of hanging rods are disengaged from said plurality of hooks.

3. The crash-resistant aircraft of claim 1, wherein said rectangle base is also fixed on a top of said fuselage via said movable fastener.

4. A crash-resistant method for controlling a crash-resistant aircraft,
wherein the crash-resistant aircraft comprises
an aircraft base, comprising a bellyhold cargo bay and wings;
a fuselage, connected with said aircraft base via a movable fastener, and comprising a cockpit, a cabin and an empennage, wherein said empennage is also connected to a tail end of said fuselage via said movable fastener;
a crash-resistant propeller system, capable of bringing said fuselage upward, and set up at a top of said cabin;
a crash-resistant recoil device, set up beneath said cabin;
wherein when said aircraft is in an accident in midair, said movable fastener is released to abandon said aircraft base and said empennage, and said crash-resistant propeller system and said crash-resistant recoil device is driven to operate, such that said fuselage will be landed safely;
wherein said top of said cabin is provided with a top cover covering said crash-resistant propeller system and capable of popping open;
wherein said crash-resistant propeller system comprises
a rectangle base;
a first propeller and a second propeller, set on two ends of said rectangle base respectively, and located on two sides of a median of said rectangle base respectively;
a rotating shaft, set on a center of said rectangle base, and driven by hydraumatic;
a Z-shaped supporting rod, set on said rotating shaft and whose two ends are telescopic rods, wherein said Z-shaped supporting rod includes two parallel rods and a diagonal rod connecting two ends of said two parallel rods forming Z shape;
a third propeller and a forth propeller, set on said two ends of said Z-shaped supporting rod respectively, wherein before said Z-shaped supporting rod is actuated, said Z-shaped supporting rod is parallel to the median of said rectangle base to make said first propeller and said third propeller arranged side by side and make said second propeller and said forth propeller arranged side by side;
wherein each of the first, second, third and fourth propellers comprise
a lifting hydraulic cylinder,
a coaxial motor above said cylinder,
a transmission shaft, actuated by motor,
a fixed propeller blade, in an upper part of a side wall of said transmission shaft,
at least one movable propeller blade, hinged with said upper part, wherein before said transmission shaft is actuated, the fixed propeller blade is arranged parallelly toward one central line of said rectangle base, and said fixed propeller blade and said movable propeller blade overlap on one transmission shaft,
slots, in said side wall of said transmission shaft, and whose number is equal to the number of said movable propeller blade, wherein an end of said slot is provided with a spring cotter and said movable propeller blade is provided with a fixing hole into which said spring cotter is plugged to fix said movable propeller blade when said movable propeller blade driven by said transmission shaft rotates along said slot to said end of said slot;
wherein the crash-resistant method comprises following steps:
releasing said movable fastener by a pilot when said crash-resistant aircraft is in trouble;
popping open said top cover and meanwhile abandoning said aircraft base and said empennage;
rising up said first propeller and said second propeller and rotating their propeller blades quickly;

rotating said supporting rod 90° so that said supporting rod is perpendicular to said rectangle base and stretching said two ends of said supporting rod respectively outward to a preset length, then rising up said third propeller and said forth propeller and rotating their propeller blades quickly;

descending the fuselage slowly and steadily by a lift force produced with four propellers' rotation simultaneously;

when said fuselage is about to land, further decreasing a descent speed of said fuselage to make said fuselage land safely when said crash-resistant recoil device beneath said fuselage start to work.

5. The crash-resistant method of claim 4, wherein the balance of said fuselage during descent is ensured by controlling a rotational speed of said four propellers.

* * * * *